United States Patent
Bachellor

(10) Patent No.: US 11,512,879 B2
(45) Date of Patent: *Nov. 29, 2022

(54) METHOD AND APPARATUS FOR CHARGE COMPENSATOR REHEAT VALVE

(71) Applicant: Lennox Industries Inc., Richardson, TX (US)

(72) Inventor: Blake Bachellor, Allen, TX (US)

(73) Assignee: Lennox Industries Inc., Richardson, TX (US)

( * ) Notice: Subject to any disclaimer, the term of this patent is extended or adjusted under 35 U.S.C. 154(b) by 64 days.

This patent is subject to a terminal disclaimer.

(21) Appl. No.: 17/035,817

(22) Filed: Sep. 29, 2020

(65) Prior Publication Data

US 2021/0010728 A1    Jan. 14, 2021

Related U.S. Application Data

(63) Continuation of application No. 16/014,436, filed on Jun. 21, 2018, now Pat. No. 10,830,514.

(51) Int. Cl.
*F25B 41/20*    (2021.01)
*F25B 39/02*    (2006.01)
(Continued)

(52) U.S. Cl.
CPC ............ *F25B 39/028* (2013.01); *F25B 41/20* (2021.01); *F25B 41/42* (2021.01); *F25B 45/00* (2013.01);
(Continued)

(58) Field of Classification Search
CPC .......... F25B 41/40; F25B 41/20; F25B 45/00; F25B 49/005; F25B 41/34; F25B 2313/02792; F25B 2500/07; F25B 41/42; F25B 2400/0405; F25B 2400/0419; F25B 2500/14; F25B 6/04; F25B 40/00;
(Continued)

(56) References Cited

U.S. PATENT DOCUMENTS 1,944,899 A   1/1934   Miller
3,563,304 A   2/1971   McGrath
(Continued)

FOREIGN PATENT DOCUMENTS

DE   10317551 B3   4/2004
EP    1821048 A2   8/2007
(Continued)

OTHER PUBLICATIONS

Ito et al., Air Conditioner, Aug. 10, 1993, JPH05203275A, Whole Document (Year: 1993).*

(Continued)

*Primary Examiner* — Larry L Furdge
(74) *Attorney, Agent, or Firm* — Shackelford, Bowen, McKinley & Norton, LLP

(57) ABSTRACT

A heating, ventilation, and air conditioning ("HVAC") system includes an evaporator coil and a compressor fluidly coupled to the evaporator coil via a suction line. A condenser coil is fluidly coupled to the compressor via a discharge line and fluidly coupled to a metering device via a liquid line. A charge compensator is fluidly coupled to the liquid line via a connection line. A charge compensator re-heat valve is disposed in the connection line.

17 Claims, 7 Drawing Sheets

(51) Int. Cl.
*F25B 45/00* (2006.01)
*F25B 49/00* (2006.01)
*G05D 16/20* (2006.01)
*F25B 41/42* (2021.01)
*F16L 55/02* (2006.01)
*F25B 41/34* (2021.01)

(52) U.S. Cl.
CPC ......... *F25B 49/005* (2013.01); *G05D 16/202* (2013.01); *F16L 55/02* (2013.01); *F25B 41/34* (2021.01); *F25B 2313/02792* (2013.01); *F25B 2500/07* (2013.01)

(58) Field of Classification Search
CPC ...... F25B 39/028; G05D 16/202; F16L 55/02; Y02B 30/70
See application file for complete search history.

(56) References Cited

U.S. PATENT DOCUMENTS

| | | | |
|---|---|---|---|
| 3,643,462 A | 2/1972 | Eberhart | |
| 3,777,508 A | 12/1973 | Imabayashi et al. | |
| 4,030,315 A | 6/1977 | Harnish | |
| 4,110,998 A | 9/1978 | Owen | |
| 4,215,555 A | 8/1980 | Cann et al. | |
| 4,236,381 A * | 12/1980 | Imral | F25B 13/00 62/324.1 |
| 4,242,873 A | 1/1981 | Hino | |
| 4,383,419 A | 5/1983 | Bottum | |
| 4,437,317 A | 3/1984 | Ibrahim | |
| 4,480,446 A | 11/1984 | Margulefsky et al. | |
| 4,522,037 A | 6/1985 | Ares et al. | |
| 4,551,983 A | 11/1985 | Atsumi et al. | |
| 4,554,792 A | 11/1985 | Margulefsky et al. | |
| 4,655,051 A | 4/1987 | Jones | |
| 4,766,734 A | 8/1988 | Dudley | |
| 4,771,610 A | 9/1988 | Nakashima et al. | |
| 4,861,561 A | 8/1989 | Pritchard | |
| RE33,212 E | 5/1990 | Lower et al. | |
| 4,942,743 A | 7/1990 | Gregory | |
| 5,042,271 A | 8/1991 | Manz | |
| 5,117,645 A | 6/1992 | Bryant | |
| 5,136,855 A | 8/1992 | Lenarduzzi | |
| 5,159,817 A | 11/1992 | Hojo et al. | |
| 5,548,971 A | 8/1996 | Rockenfeller et al. | |
| 5,628,200 A | 5/1997 | Pendergrass | |
| 5,651,263 A | 7/1997 | Nonaka et al. | |
| 5,651,265 A | 7/1997 | Grenier | |
| 5,653,120 A | 8/1997 | Meyer | |
| 5,758,514 A | 6/1998 | Genung et al. | |
| 5,802,859 A | 9/1998 | Zugibe | |
| 5,848,537 A | 12/1998 | Biancardi et al. | |
| 5,896,754 A | 4/1999 | Balthazard et al. | |
| 5,937,665 A | 8/1999 | Kiessel et al. | |
| 6,055,818 A * | 5/2000 | Valle | F24D 19/1039 62/173 |
| 6,220,566 B1 * | 4/2001 | Miller | F25B 41/20 251/58 |
| 6,470,704 B2 | 10/2002 | Shibata et al. | |
| 6,904,963 B2 | 6/2005 | Hu | |
| 8,051,675 B1 | 11/2011 | Carlson et al. | |
| 8,602,093 B2 | 12/2013 | Iwasaki | |
| 9,499,026 B2 | 11/2016 | Brodie et al. | |
| 9,599,380 B2 | 3/2017 | Yamashita | |
| 9,618,237 B2 | 4/2017 | Kim et al. | |
| 9,644,906 B2 | 5/2017 | Shimamoto et al. | |
| 9,651,287 B2 | 5/2017 | Morimoto et al. | |
| 9,664,191 B2 | 5/2017 | Tanaka | |
| 9,732,992 B2 | 8/2017 | Yamashita | |
| 9,777,950 B2 | 10/2017 | Uselton | |
| 9,823,000 B2 | 11/2017 | Wang | |
| 9,834,063 B2 | 12/2017 | Kang et al. | |
| 9,855,821 B2 | 1/2018 | Kang et al. | |
| 9,862,251 B2 | 1/2018 | Brodie et al. | |
| 10,330,358 B2 | 6/2019 | Goel | |
| 10,830,514 B2 * | 11/2020 | Bachellor | F25B 40/00 |
| 2001/0029747 A1 | 10/2001 | Gaul | |
| 2002/0003037 A1 | 1/2002 | Cousineau et al. | |
| 2004/0000153 A1 | 1/2004 | Bagley | |
| 2004/0025526 A1 | 2/2004 | Aflekt et al. | |
| 2004/0148956 A1 | 8/2004 | Arshansky et al. | |
| 2005/0066678 A1 | 3/2005 | Kamimura | |
| 2005/0120733 A1 | 6/2005 | Healy et al. | |
| 2005/0132728 A1 | 6/2005 | Lifson et al. | |
| 2005/0247070 A1 | 11/2005 | Arshansky et al. | |
| 2006/0010899 A1 | 1/2006 | Lifson et al. | |
| 2006/0053832 A1 * | 3/2006 | Ballet | F25B 43/003 62/503 |
| 2006/0123834 A1 | 6/2006 | Hwang et al. | |
| 2007/0193285 A1 | 8/2007 | Knight et al. | |
| 2008/0034777 A1 | 2/2008 | Copeland et al. | |
| 2008/0104975 A1 | 5/2008 | Gorbounov et al. | |
| 2008/0296005 A1 | 12/2008 | Taras et al. | |
| 2008/0314064 A1 | 12/2008 | Al-Eidan | |
| 2009/0211283 A1 | 8/2009 | Koh et al. | |
| 2009/0229285 A1 | 9/2009 | Sato et al. | |
| 2009/0229300 A1 | 9/2009 | Fujimoto et al. | |
| 2009/0241569 A1 | 10/2009 | Okada et al. | |
| 2009/0241573 A1 | 10/2009 | Ikegami et al. | |
| 2010/0064710 A1 | 3/2010 | Slaughter | |
| 2010/0218513 A1 | 9/2010 | Vaisman et al. | |
| 2010/0326075 A1 | 12/2010 | Fong et al. | |
| 2011/0041523 A1 | 2/2011 | Taras et al. | |
| 2011/0146321 A1 | 6/2011 | Jin | |
| 2011/0154848 A1 | 6/2011 | Jin | |
| 2011/0192176 A1 | 8/2011 | Kim et al. | |
| 2011/0197600 A1 | 8/2011 | Hamada et al. | |
| 2012/0111042 A1 | 5/2012 | Hamada et al. | |
| 2012/0227426 A1 | 9/2012 | Deaconu | |
| 2012/0227429 A1 | 9/2012 | Louvar et al. | |
| 2012/0324911 A1 | 12/2012 | Shedd | |
| 2013/0098088 A1 | 4/2013 | Lin et al. | |
| 2013/0174595 A1 | 7/2013 | Okuda et al. | |
| 2013/0340451 A1 | 12/2013 | Sapp et al. | |
| 2014/0311172 A1 | 10/2014 | Iwasaki | |
| 2014/0326018 A1 | 11/2014 | Ignatiev | |
| 2014/0345310 A1 | 11/2014 | Tamaki et al. | |
| 2015/0020536 A1 | 1/2015 | Lee et al. | |
| 2015/0040594 A1 | 2/2015 | Suzuki et al. | |
| 2015/0075204 A1 | 3/2015 | Brodie et al. | |
| 2015/0089967 A1 | 4/2015 | Kim et al. | |
| 2015/0267925 A1 | 9/2015 | Inada et al. | |
| 2015/0267946 A1 | 9/2015 | Lowstuter, Jr. et al. | |
| 2015/0276271 A1 | 10/2015 | Uselton | |
| 2015/0276290 A1 | 10/2015 | Aoyama | |
| 2015/0330684 A1 * | 11/2015 | Goel | F25B 41/20 137/593 |
| 2015/0330685 A1 | 11/2015 | Goel | |
| 2016/0146477 A1 * | 5/2016 | Jewell | F24F 3/153 62/173 |
| 2016/0178222 A1 * | 6/2016 | Bush | F24F 3/1405 62/176.1 |
| 2016/0195311 A1 | 7/2016 | Li et al. | |
| 2016/0273795 A1 | 9/2016 | Takenaka et al. | |
| 2016/0298893 A1 | 10/2016 | Knatt et al. | |
| 2017/0016659 A1 | 1/2017 | Chen et al. | |
| 2017/0059219 A1 * | 3/2017 | Goel | F25B 43/006 |
| 2018/0094841 A1 | 4/2018 | Kester et al. | |
| 2018/0160571 A1 * | 6/2018 | Baker | H05K 7/20945 |
| 2019/0323747 A1 | 10/2019 | Giles et al. | |
| 2020/0124313 A1 | 4/2020 | Todoroki et al. | |
| 2020/0240684 A1 | 7/2020 | Reardon et al. | |

FOREIGN PATENT DOCUMENTS

| | | |
|---|---|---|
| JP | H05203275 A * | 8/1993 |
| JP | H05203275 A | 8/1993 |
| JP | 11248266 | 9/1999 |
| JP | 2002195705 A | 7/2002 |
| WO | WO-94/14016 A1 | 6/1994 |

(56) References Cited

OTHER PUBLICATIONS

U.S. Appl. No. 16/014,436, Bachellor.
Lattanzi, Matt and Priestley, Doug, Micro-Channel Evaporator-Coil Technology, RSES Journal [online], Oct. 2012, pp. 14-18, [retrieved on Sep. 30, 2017]. Retrieved from the internett <URL: https://www.rses.org/assets/rses_journal/1012_Evaporators.pdf>.
"Microchannel Coil Servicing Guidelines: Trane Unitary Light and Commercial Units", Trane [online], May 5, 2011, pp. 1-16, [retrieved on Sep. 30, 2017]. Retrieved from the internet <https://www.trane.com/content/dam/Trane/Commercial/lar/es/product-systems/comercial/Rooftops/Accesorios-Rooftops;/IOM/Microchannel%20IOM%20(lngl%C3%A9s).pdf>.

\* cited by examiner

METHOD AND APPARATUS FOR CHARGE COMPENSATOR REHEAT VALVE

CROSS-REFERENCE TO RELATED APPLICATIONS

This application is a continuation of U.S. patent application Ser. No. 16/014,436, filed on Jun. 21, 2018. U.S. patent Ser. No. 16/014,436. U.S. patent application Ser. No. 14/279,043, filed on May 15, 2014 and U.S. patent application Ser. No. 14/706,945, filed on May 7, 2015 are incorporated herein by reference.

TECHNICAL FIELD

The present disclosure relates generally to heating, ventilation, and air conditioning (HVAC) systems and applications and more particularly, but not by way of limitation, to methods and systems for addressing refrigerant pressure and dehumidification performance in HVAC systems.

BACKGROUND

This section provides background information to facilitate a better understanding of the various aspects of the disclosure. It should be understood that the statements in this section of this document are to be read in this light, and not as admissions of prior art.

Currently, most HVAC systems utilize a charge compensator located in a liquid line downstream of a condenser as a way to accommodate variations in refrigerant discharge pressure. During normal operation, such liquid-line charge compensators are kept free of liquid by utilizing radiant heat from the condenser. This approach, however, is not effective in dehumidification (also referred to as "re-heat") applications. When an HVAC system operates in re-heat mode, heat is first rejected from the refrigerant in a re-heat coil. By the time the refrigerant reaches the condenser, it is already saturated, reducing the condenser's ability to drive liquid from the liquid-line charge compensator. This causes the HVAC system to operate undercharged resulting in significant loss of latent capacity in the re-heat mode.

SUMMARY

This summary is provided to introduce a selection of concepts that are further described below in the detailed description. This summary is not intended to identify key or essential features of the claimed subject matter, nor is it to be used as an aid in limiting the scope of the claimed subject matter.

In one aspect, the present disclosure relates to a heating, ventilation, and air conditioning ("HVAC") system. The HVAC system includes an evaporator coil and a compressor fluidly coupled to the evaporator coil via a suction line. A condenser coil is fluidly coupled to the compressor via a discharge line and fluidly coupled to a metering device via a liquid line. A charge compensator is fluidly coupled to the liquid line via a connection line. A charge compensator re-heat valve is disposed in the connection line.

In another aspect, the present disclosure relates to a condenser coil. The condenser coil includes a plurality of micro channels. A liquid line is coupled to the plurality of micro channels. A charge compensator is fluidly coupled to the liquid line via a connection line. A charge compensator re-heat valve is disposed in the connection line.

In another aspect, the present disclosure relates to a method for operating a charge compensator. The method includes fluidly coupling a charge compensator to a liquid line. The liquid line is fluidly coupled to a condenser coil. A charge compensator re-heat valve is arranged in a connection line coupling the liquid line and the charge compensator. An HVAC system is operated in a re-heat mode. A charge compensator re-heat valve is signaled, via an HVAC controller, to move to a closed position responsive to the HVAC system operating in the re-heat mode.

BRIEF DESCRIPTION OF THE DRAWINGS

The disclosure is best understood from the following detailed description when read with the accompanying figures. It is emphasized that, in accordance with standard practice in the industry, various features are not drawn to scale. In fact, the dimensions of various features may be arbitrarily increased or reduced for clarity of discussion.

DETAILED DESCRIPTION

Figure 1:
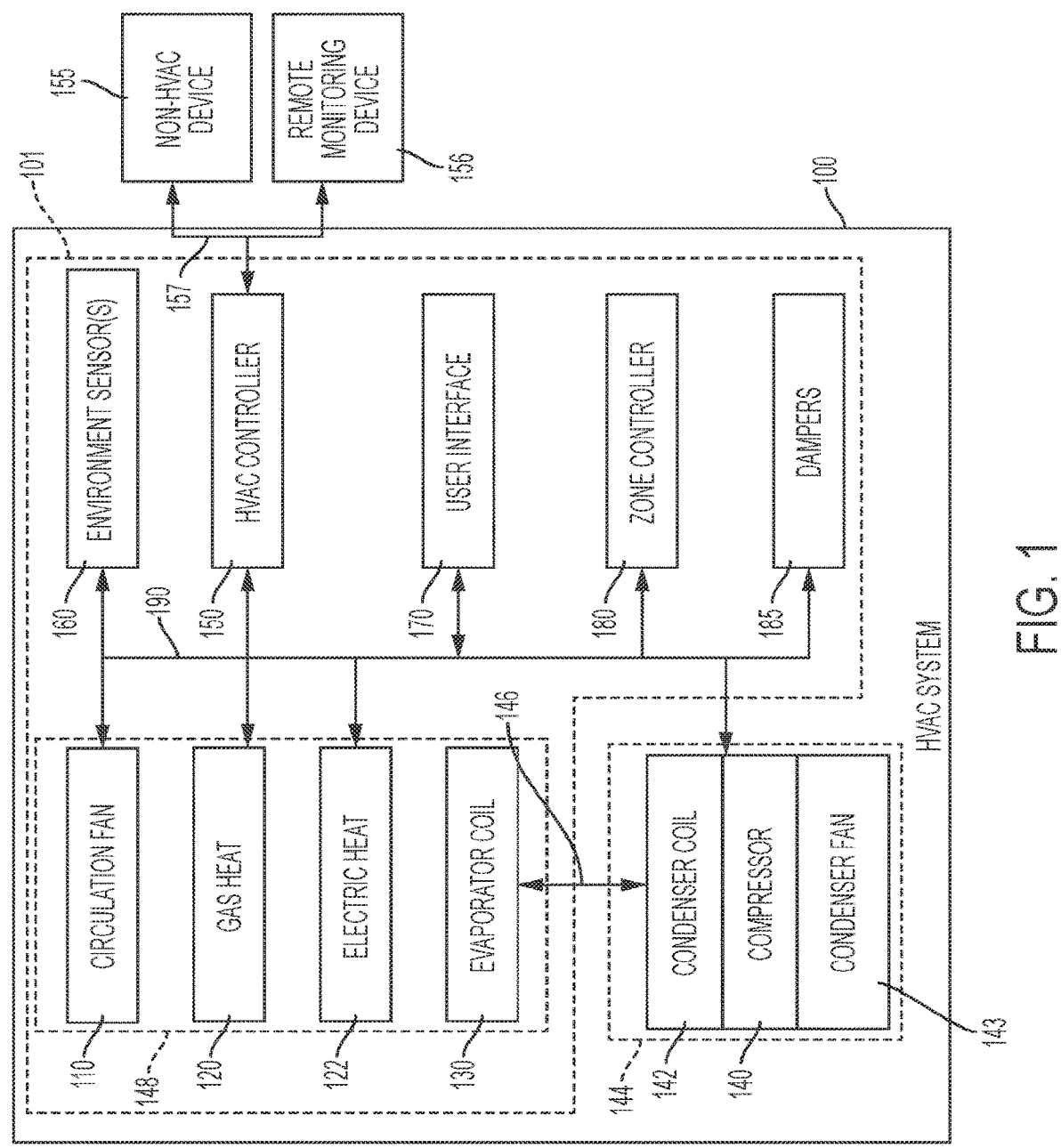
FIG. 1 is a block diagram of an exemplary HVAC system.

Various embodiments will now be described more fully with reference to the accompanying drawings. The disclosure may, however, be embodied in many different forms and should not be construed as limited to the embodiments set forth herein.

HVAC systems are frequently utilized to adjust both temperature of conditioned air as well as relative humidity of the conditioned air. A cooling capacity of an HVAC system is a combination of the HVAC system's sensible cooling capacity and latent cooling capacity. Sensible cooling capacity refers to an ability of the HVAC system to remove sensible heat from conditioned air. Latent cooling capacity refers to an ability of the HVAC system to remove latent heat from conditioned air. Sensible cooling capacity and latent cooling capacity vary with environmental conditions. Sensible heat refers to heat that, when added to or removed from the conditioned air, results in a temperature change of the conditioned air. Latent heat refers to heat that, when added to or removed from the conditioned air, results in a phase change of, for example, water within the conditioned air. Sensible-to-total ratio ("S/T ratio") is a ratio of sensible heat to total heat (sensible heat+latent heat). The lower the S/T ratio, the higher the latent cooling capacity of the HVAC system for given environmental conditions. The S/T ratio is negative in the case of heating.

Sensible cooling load refers to an amount of heat that must be removed from the enclosed space to accomplish a desired temperature change of the air within the enclosed space. The sensible cooling load is reflected by a temperature within the enclosed space as read on a dry-bulb thermometer. Latent cooling load refers to an amount of heat that must be removed from the enclosed space to accomplish a desired change in humidity of the air within the enclosed space. The latent cooling load is reflected by a temperature within the enclosed space as read on a wet-bulb thermometer. Setpoint or temperature setpoint refers to a target temperature setting of the HVAC system as set by a user or automatically based on a pre-defined schedule.

When there is a high sensible cooling load such as, for example, when outside-air temperature is significantly warmer than an inside-air temperature setpoint, the HVAC system will continue to operate in an effort to effectively cool and dehumidify the conditioned air. Such operation of the HVAC system is known as "cooling mode." When there is a low sensible cooling load but high relative humidity such as, for example, when the outside air temperature is relatively close to the inside air temperature setpoint, but the outside air is considerably more humid than the inside air, supplemental air dehumidification is often undertaken to avoid occupant discomfort. Such operation of the HVAC system is known as "re-heat mode."

An existing approach to air dehumidification involves lowering the temperature setpoint of the HVAC system. This approach causes the HVAC system to operate for longer periods of time than if the temperature setpoint of the HVAC system were set to a higher temperature. This approach serves to reduce both the temperature and humidity of the conditioned air. However, this approach results in over-cooling of the conditioned air, which over-cooling often results in occupant discomfort. Additionally, consequent extended run times cause the HVAC system to consume more energy, which leads to higher utility costs.

Another air dehumidification approach involves the re-heating of air leaving an evaporator coil. This approach typically involves directing at least a portion of the refrigerant from the compressor to a re-heat coil positioned downwind of the evaporator coil. The re-heat coil transfers some heat energy from the refrigerant to the air leaving the evaporator thereby raising the dry-bulb temperature of air leaving the evaporator and lowering the temperature of the refrigerant before the refrigerant moves to the condenser. Re-heating the air serves to lower the S/T ratio, thereby improving dehumidification performance.

FIG. 1 illustrates an HVAC system 100. In various embodiments, the HVAC system 100 is a networked HVAC system that is configured to condition air via, for example, heating, cooling, humidifying, or dehumidifying air within an enclosed space 101. In various embodiments, the enclosed space 101 is, for example, a house, an office building, a warehouse, and the like. Thus, the HVAC system 100 can be a residential system or a commercial system such as, for example, a roof top system. For exemplary illustration, the HVAC system 100 as illustrated in FIG. 1 includes various components; however, in other embodiments, the HVAC system 100 may include additional components that are not illustrated but typically included within HVAC systems.

The HVAC system 100 includes a circulation fan 110, a gas heat 120, an electric heat 122 typically associated with the circulation fan 110, and a refrigerant evaporator coil 130, also typically associated with the circulation fan 110. The circulation fan 110, the gas heat 120, the electric heat 122, and the refrigerant evaporator coil 130 are collectively referred to as an "indoor unit" 148. In various embodiments, the indoor unit 148 is located within, or in close proximity to, the enclosed space 101. The HVAC system 100 also includes a compressor 140 an associated condenser coil 142, and a condenser fan 143, which are typically referred to as an "outdoor unit" 144. In various embodiments, the outdoor unit 144 is, for example, a rooftop unit or a ground-level unit. The compressor 140 and the associated condenser coil 142 are connected to an associated evaporator coil 130 by a refrigerant line 146. In various embodiments, the compressor 140 is, for example, a single-stage compressor, a multi-stage compressor, a single-speed compressor, or a variable-speed compressor. In various embodiments, the circulation fan 110, sometimes referred to as a blower, may be configured to operate at a single speed (i.e. constant air volume), multi-speed (i.e. multi-stage air volume), or variable motor speeds (i.e. variable air volume) to circulate air through the indoor unit 148, whereby the circulated air is conditioned and supplied to the enclosed space 101. In various embodiments, the condenser fan 143 may be configured to operate at a single speed, multiple speeds, or variable motor speeds to circulate air through the condenser coil 142.

Still referring to FIG. 1, the HVAC system 100 includes an HVAC controller 150 that is configured to control operation of the various components of the HVAC system 100 such as, for example, the circulation fan 110, the gas heat 120, the electric heat 122, and the compressor 140 to regulate the environment of the enclosed space 101. In some embodiments, the HVAC system 100 can be a zoned system. In such embodiments, the HVAC system 100 includes a zone controller 180, dampers 185, and a plurality of environment sensors 160. In various embodiments, the HVAC controller 150 cooperates with the zone controller 180 and the dampers 185 to regulate the environment of the enclosed space 101.

The HVAC controller 150 may be an integrated controller or a distributed controller that directs operation of the HVAC system 100. The HVAC controller 150 includes an interface to receive, for example, thermostat calls, temperature setpoints, blower control signals, environmental conditions, and operating mode status for various zones of the HVAC system 100. For example, in various embodiments, the environmental conditions may include indoor temperature and relative humidity of the enclosed space 101. In various embodiments, the HVAC controller 150 also includes a processor and a memory to direct operation of the HVAC system 100 including, for example, a speed of the circulation fan 110.

Still referring to FIG. 1, in some embodiments, the plurality of environment sensors 160 are associated with the HVAC controller 150 and also optionally associated with a user interface 170. The plurality of environment sensors 160 provide environmental information within a zone or zones of the enclosed space 101 such as, for example, temperature and humidity of the enclosed space 101 to the HVAC controller 150. The plurality of environment sensors 160 may also send the environmental information to a display of the user interface 170. In some embodiments, the user interface 170 provides additional functions such as, for example, operational, diagnostic, status message display, and a visual interface that allows at least one of an installer, a user, a support entity, and a service provider to perform actions with respect to the HVAC system 100. In some embodiments, the user interface 170 is, for example, a thermostat of the HVAC system 100. In other embodiments, the user interface 170 is associated with at least one sensor of the plurality of environment sensors 160 to determine the environmental condition information and communicate that information to the user. The user interface 170 may also include a display, buttons, a microphone, a speaker, or other components to communicate with the user. Additionally, the user interface 170 may include a processor and memory that is configured to receive user-determined parameters such as, for example, a relative humidity of the enclosed space 101, and calculate operational parameters of the HVAC system 100 as disclosed herein.

In various embodiments, the HVAC system 100 is configured to communicate with a plurality of devices such as, for example, a monitoring device 156, a communication device 155, and the like. In various embodiments, the monitoring device 156 is not part of the HVAC system. For example, the monitoring device 156 is a server or computer of a third party such as, for example, a manufacturer, a support entity, a service provider, and the like. In other embodiments, the monitoring device 156 is located at an office of, for example, the manufacturer, the support entity, the service provider, and the like.

In various embodiments, the communication device 155 is a non-HVAC device having a primary function that is not associated with HVAC systems. For example, non-HVAC devices include mobile-computing devices that are configured to interact with the HVAC system 100 to monitor and modify at least some of the operating parameters of the HVAC system 100. Mobile computing devices may be, for example, a personal computer (e.g., desktop or laptop), a tablet computer, a mobile device (e.g., smart phone), and the like. In various embodiments, the communication device 155 includes at least one processor, memory and a user interface, such as a display. One skilled in the art will also understand that the communication device 155 disclosed herein includes other components that are typically included in such devices including, for example, a power supply, a communications interface, and the like.

The zone controller 180 is configured to manage movement of conditioned air to designated zones of the enclosed space 101. Each of the designated zones include at least one conditioning or demand unit such as, for example, the gas heat 120 and at least one user interface 170 such as, for example, the thermostat. The zone-controlled HVAC system 100 allows the user to independently control the temperature in the designated zones. In various embodiments, the zone controller 180 operates electronic dampers 185 to control air flow to the zones of the enclosed space 101.

In some embodiments, a data bus 190, which in the illustrated embodiment is a serial bus, couples various components of the HVAC system 100 together such that data is communicated therebetween. The data bus 190 may include, for example, any combination of hardware, software embedded in a computer readable medium, or encoded logic incorporated in hardware or otherwise stored (e.g., firmware) to couple components of the HVAC system 100 to each other. As an example and not by way of limitation, the data bus 190 may include an Accelerated Graphics Port (AGP) or other graphics bus, a Controller Area Network (CAN) bus, a front-side bus (FSB), a HYPERTRANSPORT (HT) interconnect, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or any other suitable bus or a combination of two or more of these. In various embodiments, the data bus 190 may include any number, type, or configuration of data buses 190, where appropriate. In particular embodiments, one or more data buses 190 (which may each include an address bus and a data bus) may couple the HVAC controller 150 to other components of the HVAC system 100. In other embodiments, connections between various components of the HVAC system 100 are wired. For example, conventional cable and contacts may be used to couple the HVAC controller 150 to the various components. In some embodiments, a wireless connection is employed to provide at least some of the connections between components of the HVAC system such as, for example, a connection between the HVAC controller 150 and the circulation fan 110 or the plurality of environment sensors 160.

Figure 2:
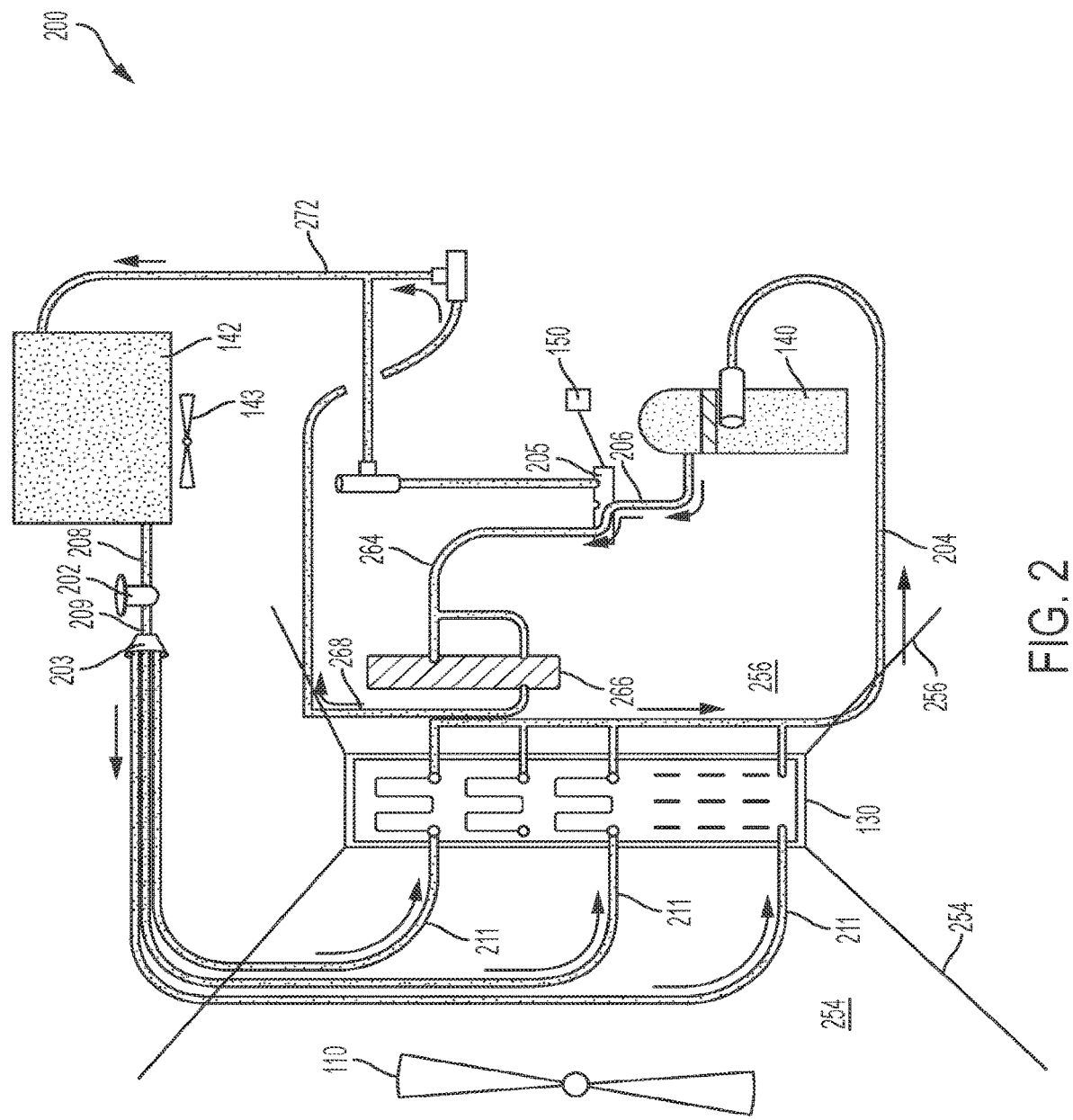
FIG. 2 is a schematic diagram of an exemplary HVAC system with a re-heat coil.

FIG. 2 is a schematic diagram of an HVAC system 200 with a re-heat coil 266. For purposes of discussion, FIG. 2 is described herein relative to FIG. 1. The HVAC system 200 includes the refrigerant evaporator coil 130, the condenser coil 142, the compressor 140, a metering device 202, and a distributor 203. In various embodiments, the metering device 202 is, for example, a thermostatic expansion valve or a throttling valve. The refrigerant evaporator coil 130 is fluidly coupled to the compressor 140 via a suction line 204. The compressor 140 is fluidly coupled to a flow-directing device 205 via a discharge line 206. In the embodiment shown in FIG. 2, the flow-directing device 205 is a reversing valve; however, in other embodiments, another type of flow-directing device or system of flow directing devices could be utilized. The flow-directing device 205 is electrically coupled to the HVAC controller 150 via, for example, a wired or a wireless connection. In a re-heat mode, the HVAC controller 150 signals the flow-directing device 205 to fluidly couple the discharge line 206 to a re-heat feed line 264. The re-heat feed line 264 is fluidly coupled to a re-heat coil 266. A re-heat return line 268 and a condenser intake line 272 fluidly couple the re-heat coil 266 to the condenser coil 142. The condenser coil 142 is fluidly coupled to the metering device 202 via a liquid line 208. The distributor 203 is fluidly coupled to the metering device 202 via an evaporator intake line 209. The distributor 203 divides refrigerant flow into a plurality of evaporator circuit lines 211 and directs refrigerant to the refrigerant evaporator coil 130. In the embodiment illustrated in FIG. 2, three evaporator circuit lines 211 are shown by way of example; however, in other embodiments, the distributor 203 could divide refrigerant flow into any number of evaporator circuit lines 211.

Still referring to FIG. 2, during operation, low-pressure, low-temperature refrigerant is circulated through the refrigerant evaporator coil 130. The refrigerant is initially in a liquid/vapor state. In various embodiments, the refrigerant is, for example, R-22, R-134a, R-410A, R-744, or any other suitable type of refrigerant as dictated by design requirements. Air from within the enclosed space 101, which is typically warmer than the refrigerant, is circulated across the refrigerant evaporator coil 130 by the circulation fan 110. The refrigerant begins to boil after absorbing heat from the air and changes state to a low-pressure, low-temperature, super-heated vapor refrigerant. Saturated vapor, saturated liquid, and saturated fluid refer to a thermodynamic state where a liquid and its vapor exist in approximate equilibrium with each other. Super-heated vapor refers to a thermodynamic state where a vapor is heated above a saturation temperature of the vapor. Sub-cooled liquid refers to a thermodynamic state where a liquid is cooled below the saturation temperature of the liquid.

The low-pressure, low-temperature, super-heated vapor refrigerant is introduced into the compressor 140 via the suction line 204. The compressor 140 increases the pressure of the low-pressure, low-temperature, super-heated vapor refrigerant and, by operation of the ideal gas law, also increases the temperature of the low-pressure, low-temperature, super-heated vapor refrigerant to form a high-pressure, high-temperature, superheated vapor refrigerant. The high-pressure, high-temperature, superheated vapor refrigerant enters the flow-directing device 205 where, when operating in the re-heat mode, the high-pressure, high-temperature, superheated vapor refrigerant is directed into the re-heat feed line 264. The re-heat feed line 264 directs the high-pressure, high-temperature, superheated vapor refrigerant to the re-heat coil 266. The re-heat coil 266 is positioned downwind from the refrigerant evaporator coil 130 such that air circulated by the circulation fan 110 passes from the enclosed space 101, into the return air duct 254, and through the evaporator coil 130 before passing through the re-heat coil 266. The re-heat coil 266 facilitates transfer of a portion of the heat stored in the high-pressure, high-temperature, superheated vapor refrigerant to air moving through a supply air duct 256, thereby heating the air in the supply air duct 256. The air in the supply air duct 256 is then circulated into the enclosed space 101 by the circulation fan 110. After leaving the re-heat coil 266, the high-pressure, high-temperature, superheated vapor refrigerant travels through a re-heat return line 268 to a condenser intake line 272. When operating in a cooling mode, the flow-directing device 205 bypasses the re-heat coil 266 and directs the high-pressure, high-temperature, superheated vapor refrigerant to the condenser coil 142 via the condenser intake line 272.

Outside air is circulated around the condenser coil 142 by the condenser fan 143. The outside air is typically cooler than the high-pressure, high-temperature, superheated vapor refrigerant present in the condenser coil 142. Thus, heat is transferred from the high-pressure, high-temperature, superheated vapor refrigerant to the outside air. Removal of heat from the high-pressure, high-temperature, superheated vapor refrigerant causes the high-pressure, high-temperature, superheated vapor refrigerant to condense and change from a vapor state to a high-pressure, high-temperature, sub-cooled liquid state. The high-pressure, high-temperature, sub-cooled liquid refrigerant leaves the condenser coil 142 via the liquid line 208 and enters the metering device 202.

In the metering device 202, the pressure of the high-pressure, high-temperature, sub-cooled liquid refrigerant is abruptly reduced due to, for example, regulation of an amount of refrigerant that travels to the distributor 203. Abrupt reduction of the pressure of the high-pressure, high-temperature, sub-cooled liquid refrigerant causes sudden, rapid, evaporation of a portion of the high-pressure, high-temperature, sub-cooled liquid refrigerant, commonly known as flash evaporation. Flash evaporation lowers the temperature of the resulting liquid/vapor refrigerant mixture to a temperature lower than a temperature of the air in the enclosed space 101. The liquid/vapor refrigerant mixture leaves the metering device 202 and enters the distributor 203 via the evaporator intake line 209. The distributor 203 divides refrigerant flow into the plurality of evaporator circuit lines 211 and directs refrigerant to the refrigerant evaporator coil 130.

Figure 3:
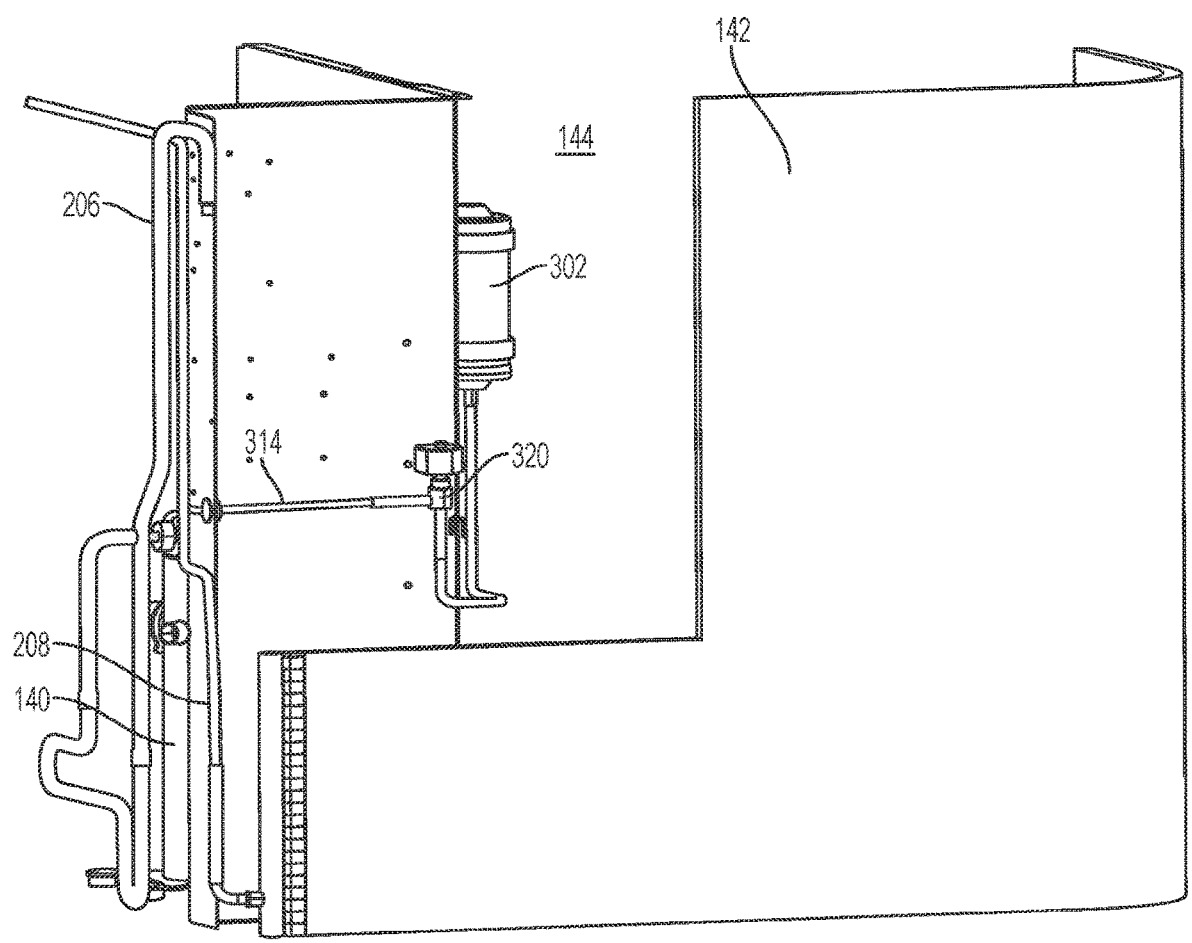
FIG. 3 is a perspective view of an exemplary outdoor unit illustrating a charge compensator.
Figure 4:
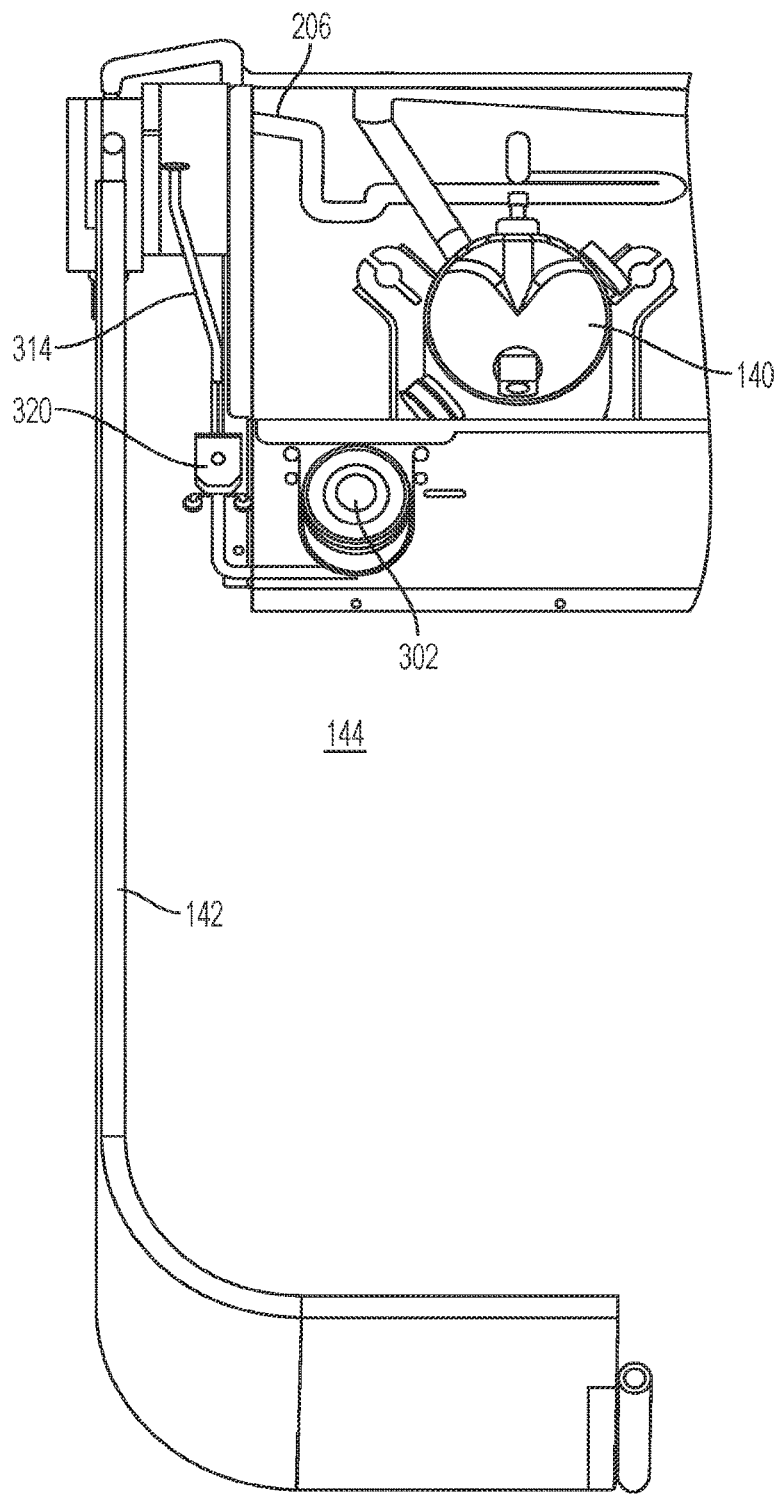
FIG. 4 is a top view of the outdoor unit of FIG. 3.

FIG. 3 is a perspective view of the outdoor unit 144 illustrating a charge compensator 302. FIG. 4 is a top view of the outdoor unit 144. For purposes of discussion, FIGS. 3-4 are described herein relative to FIGS. 1-2. As noted above, low-pressure, low-temperature, super-heated vapor refrigerant is introduced into the compressor 140 via the suction line 204. The compressor 140 increases the pressure of the low-pressure, low-temperature, super-heated vapor refrigerant and, by operation of the ideal gas law, also increases the temperature of the low-pressure, low-temperature, super-heated vapor refrigerant to form a high-pressure, high-temperature, superheated vapor refrigerant. The high-pressure, high-temperature, superheated vapor refrigerant travels from the compressor 140 to the condenser coil 142 via the discharge line 206. In various embodiments, the condenser coil 142 includes a plurality of micro channels to facilitate heat transfer between the refrigerant and outside air. Outside air is circulated around the condenser coil 142 by the condenser fan 143. In various embodiments, the condenser coil 142 may be a single-pass condenser coil or a multi-pass condenser coil. High-pressure, high-temperature, sub-cooled liquid refrigerant leaves the condenser coil 142 via the liquid line 208.

Still referring to FIGS. 3-4, the charge compensator 302 is fluidly coupled to the liquid line 208 via a connection line 314. A charge compensator re-heat valve 320 is disposed in the connection line 314 such that, when closed, the charge compensator re-heat valve 320 prevents flow of refrigerant into the charge compensator 302, thereby preventing latent capacity loss. In various embodiments, the charge compensator re-heat valve 320 is moveable between an open position and a closed position and is, for example, an open-biased, ¼ inch, solenoid ball valve. However, in other embodiments, other types and sizes of valves could be utilized. The charge compensator re-heat valve 320 is electrically coupled to the HVAC controller 150 via, for example, a wired or a wireless connection. During operation, when the HVAC system 200 operates in the cooling mode, the HVAC controller 150 signals the charge compensator re-heat valve 320 to move to the open position thereby allowing refrigerant to enter the charge compensator 302 during, for example, a spike in refrigerant pressure. When the HVAC system 200 operates in the re-heat mode, when refrigerant pressure spikes are not prevalent, the HVAC controller 150 signals the charge compensator re-heat valve 320 to move to the closed position thereby preventing refrigerant from entering the charge compensator 302, and, in doing so, preventing latent capacity loss.

Figure 5:
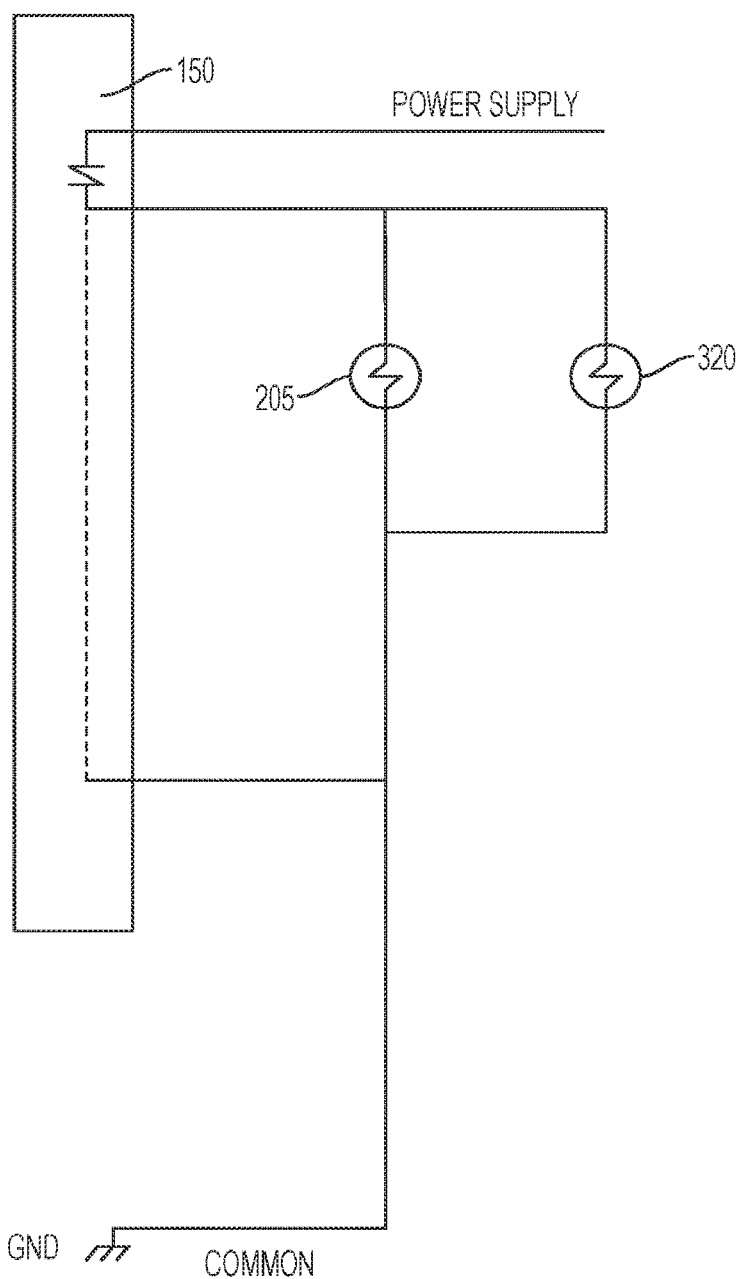
FIG. 5 is a wiring diagram for an exemplary charge compensator re-heat valve.

FIG. 5 is a sample wiring diagram for the charge compensator re-heat valve 320. For purposes of discussion. FIG. 5 is described herein relative to FIGS. 1-4. The flow-directing device 205 is electrically coupled to the HVAC controller 150. The charge compensator re-heat valve 320 is electrically connected to the HVAC controller 150 in parallel with the flow-directing device 205. Thus, when an electrical voltage is applied by the HVAC controller 150 to the flow-directing device 205 to cause the HVAC system 200 to operate in the re-heat mode, an electrical voltage is also applied to the charge compensator re-heat valve 320 causing the charge compensator re-heat valve 320 to move to the closed position and prevent movement of refrigerant into the charge compensator 302.

Figure 6:
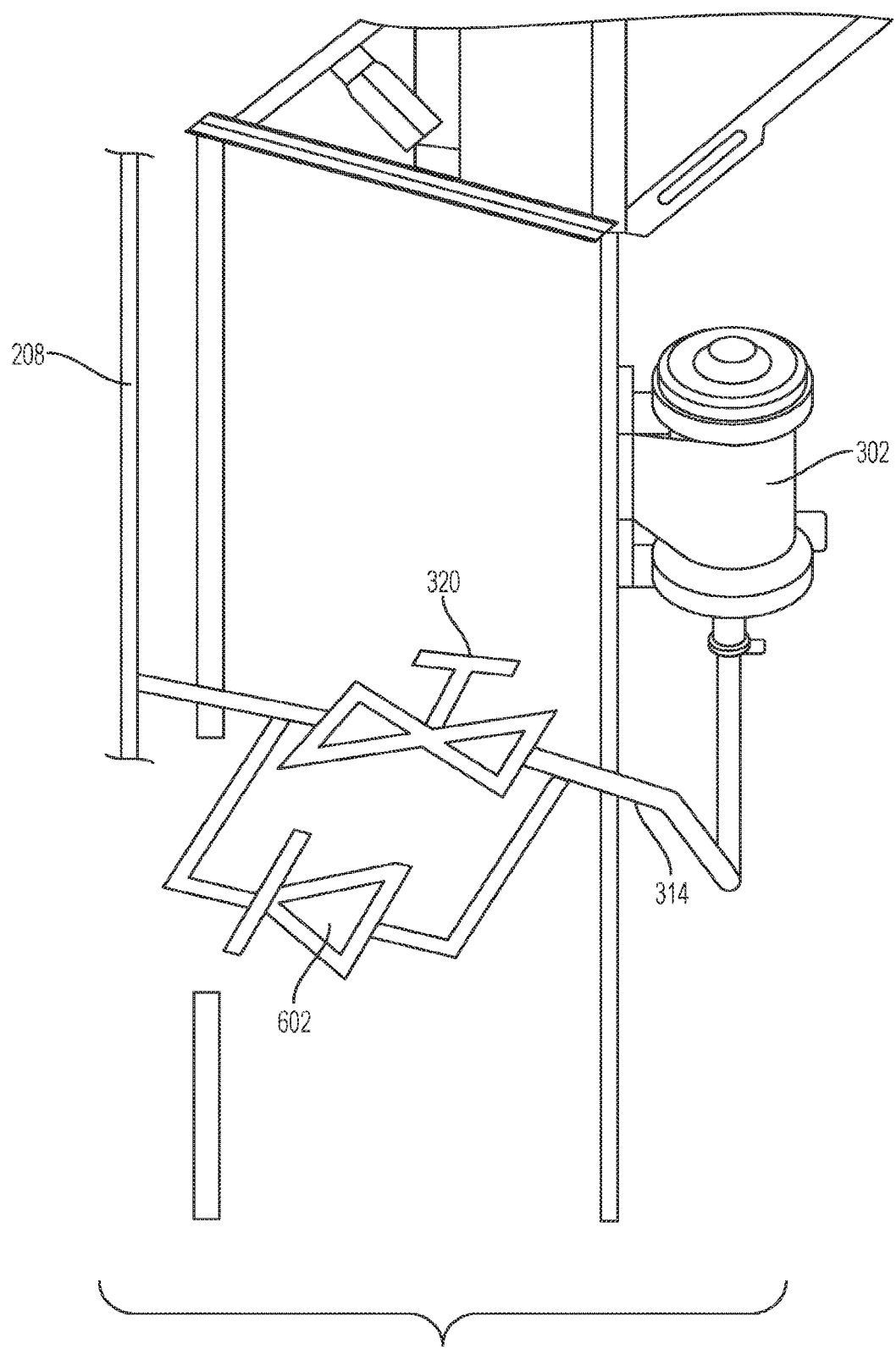
FIG. 6 is a schematic diagram of the charge compensator utilizing a check valve.

FIG. 6 is a schematic diagram of the charge compensator 302 utilizing a check valve 602. For purposes of discussion. FIG. 6 is described herein relative to FIGS. 1-2. As previously discussed, the charge compensator re-heat valve 320 is disposed in the connection line 314 such that, when in the closed position, the charge compensator re-heat valve 320 prevents movement of refrigerant into or out of the charge compensator 302. In various embodiments, a check valve 602 may be fluidly coupled to the connection line 314 in parallel with the charge compensator re-heat valve 320. The check valve 602 is arranged so as to permit refrigerant flow out of the charge compensator 302 to the liquid line 208 and to prevent refrigerant flow from the liquid line 208 into the charge compensator 302. Thus, when the HVAC system 200 is operating in the re-heat mode, and the charge compensator re-heat valve 320 is closed, refrigerant that may be present in the charge compensator 302 may drain from the charge compensator 302 through the check valve 602. When operating in the re-heat mode, the charge compensator re-heat valve 320 and the check valve 602 will prevent flow of refrigerant from the liquid line 208 into the charge compensator 302, thereby preventing latent capacity loss. When the HVAC system is operating in the cooling mode, refrigerant may flow from the liquid line 208 into the charge compensator 302 through the charge compensator re-heat valve 320.

Figure 7:
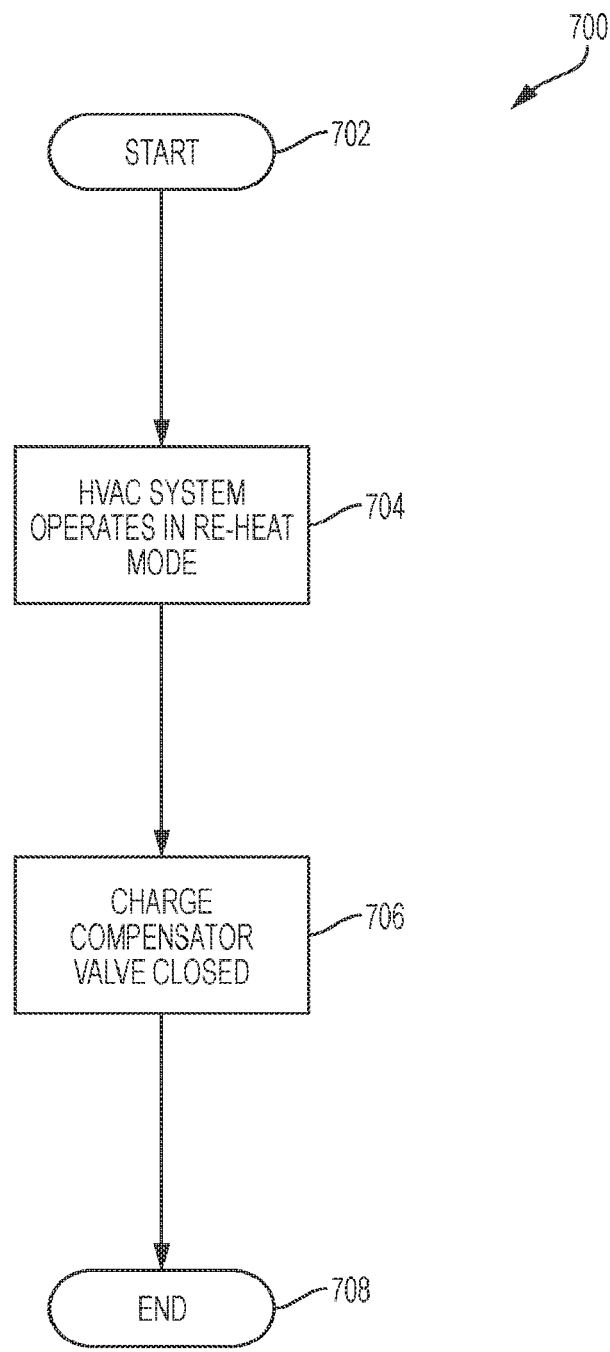
FIG. 7 is a flow diagram of an exemplary process for utilizing a charge compensator.

FIG. 7 is a flow diagram of a process 700 for utilizing the charge compensator 302. For purposes of discussion, FIG. 7 is described herein relative to FIGS. 1-4. The process 700 starts at block 702. At block 704, the HVAC controller 150 signals the flow-directing device 205 to operate in re-heat mode. At block 706, the HVAC controller 150 signals the charge compensator re-heat valve 320 to close thereby preventing flow of refrigerant into the charge compensator 302, thereby preventing latent capacity losses. The process 700 ends at block 708. In various embodiments, a time delay may be added between the actuation of the flow-directing device 205 and the closing of the charge compensator re-heat valve 320 such that the charge compensator re-heat valve 320 closes a predetermined period of time after the flow-directing device 205 places the HVAC system 200 in the re-heat mode. Such a time delay allows accumulated refrigerant in the charge compensator 302 to drain from the charge compensator, thereby improving latent capacity during re-heat mode.

Depending on the embodiment, certain acts, events, or functions of any of the algorithms, methods, or processes described herein can be performed in a different sequence, can be added, merged, or left out altogether (e.g., not all described acts or events are necessary for the practice of the algorithms, methods, or processes). Moreover, in certain embodiments, acts or events can be performed concurrently, e.g., through multi-threaded processing, interrupt processing, or multiple processors or processor cores or on other parallel architectures, rather than sequentially. Although certain computer-implemented tasks are described as being performed by a particular entity, other embodiments are possible in which these tasks are performed by a different entity.

Conditional language used herein, such as, among others. "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, the processes described herein can be embodied within a form that does not provide all of the features and benefits set forth herein, as some features can be used or practiced separately from others. The scope of protection is defined by the appended claims rather than by the foregoing description. All changes which come within the meaning and range of equivalency of the claims are to be embraced within their scope.

What is claimed is:

1. A heating, ventilation, and air conditioning ("HVAC") system comprising:
   an evaporator coil;
   a compressor fluidly coupled to the evaporator coil via a suction line;
   a condenser coil fluidly coupled to the compressor via a discharge line and fluidly coupled to a metering device via a liquid line, wherein the metering device comprises at least one of a thermostatic expansion valve and a throttling valve;
   a charge compensator fluidly coupled to the liquid line via a connection line, wherein the charge compensator is a stand-alone device;
   wherein the connection line comprises a first end and a second end;
   wherein the first end is coupled to the liquid line and the second end is coupled to the charge compensator;
   a charge compensator re-heat valve disposed in the connection line; and
   a check valve arranged in the connection line in parallel with the charge compensator re-heat valve.

2. The HVAC system of claim 1, comprising a flow-directing device fluidly coupled to the discharge line and fluidly coupled to a re-heat coil, wherein the flow-directing device comprises a reversing valve.

3. The HVAC system of claim 2, comprising an HVAC controller electrically connected to the flow-directing device and the charge compensator re-heat valve.

4. The HVAC system of claim 3, wherein the charge compensator re-heat valve is electrically coupled to the HVAC controller in parallel with the flow-directing device.

5. The HVAC system of claim 3, wherein the charge compensator re-heat valve is in a closed position when the HVAC system operates in a re-heat mode.

6. The HVAC system of claim 1, wherein the HVAC system operates in at least one of a cooling mode and a re-heat mode.

7. The HVAC system of claim 6, wherein when operating in the re-heat mode, a flow-directing device directs refrigerant from the compressor to the re-heat coil, wherein the flow-directing device comprises a reversing valve.

8. The HVAC system of claim 1, wherein:
   the check valve facilitates draining of the charge compensator when the HVAC system is operating in a re-heat mode and the charge compensator re-heat valve is in a closed position; and
   the check valve permits flow of refrigerant from the charge compensator into the liquid line and prevents flow of refrigerant from the liquid line into the charge compensator.

9. A condenser coil, comprising:
   a plurality of micro channels;
   a liquid line coupled to the plurality of micro channels;
   a charge compensator fluidly coupled to the liquid line via a connection line, wherein the charge compensator is a stand-alone device;
   wherein the connection line comprises a first end and a second end;
   wherein the first end is coupled to the liquid line and the second end is coupled to the charge compensator;
   a charge compensator re-heat valve disposed in the connection line; and a check valve arranged in the connection line in parallel with the charge compensator re-heat valve.

10. The condenser coil of claim 9, wherein the charge compensator re-heat valve is electrically coupled to an HVAC controller.

11. The condenser coil of claim 9, wherein the check valve permits flow of refrigerant from the charge compensator into the liquid line and prevents flow of refrigerant from the liquid line into the charge compensator.

12. The condenser coil of claim 9, wherein the check valve facilitates draining of the charge compensator when the charge compensator re-heat valve is in a closed position.

13. The condenser coil of claim 9, wherein the charge compensator re-heat valve is a solenoid ball valve.

14. A method for operating a charge compensator, the method comprising:
   fluidly coupling a charge compensator to a liquid line via a connection line, the liquid line being fluidly coupled to a condenser coil, wherein the charge compensator is a stand-alone device;
   wherein the connection line comprises a first end and a second end;
   wherein the first end is coupled to the liquid line and the second end is coupled to the charge compensator;
   arranging a charge compensator re-heat valve in the connection line;
   arranging a check valve in the connection line in parallel with the charge compensator re-heat valve;
   operating the HVAC system in at least one of a re-heat mode and a cooling mode; and
   signaling, via an HVAC controller, the charge compensator re-heat valve to move to a closed position responsive to the HVAC system operating in the re-heat mode.

15. The method of claim 14, comprising electrically coupling the charge compensator re-heat valve to an HVAC controller in parallel with a flow-directing device, wherein the flow-directing device comprises a reversing valve.

16. The method of claim 14, wherein:
   the check valve is arranged to permit refrigerant flow from the charge compensator to the liquid line and prevent refrigerant flow from the liquid line into the charge compensator; and
   the check valve is arranged to permit drainage of refrigerant from the charge compensator when the charge compensator re-heat valve is in the closed position.

17. The method of claim 14, wherein the signaling occurs after a pre-determined period of time after the HVAC system begins operation in the re-heat mode.

* * * * *